(12) United States Patent
Kano et al.

(10) Patent No.: US 10,872,418 B2
(45) Date of Patent: Dec. 22, 2020

(54) EDGE DETECTION DEVICE, AN EDGE DETECTION METHOD, AND AN OBJECT HOLDING DEVICE

(71) Applicant: Kabushiki Kaisha Toshiba, Minato-ku (JP)

(72) Inventors: Hiroya Kano, Ota (JP); Hideaki Okano, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 131 days.

(21) Appl. No.: 15/699,187

(22) Filed: Sep. 8, 2017

(65) Prior Publication Data

US 2018/0101958 A1    Apr. 12, 2018

(30) Foreign Application Priority Data

Oct. 11, 2016  (JP) .................................. 2016-200197
Aug. 25, 2017  (JP) .................................. 2017-162757

(51) Int. Cl.
| | | |
|---|---|---|
| *G06K 9/00* | (2006.01) | |
| *G06T 7/13* | (2017.01) | |
| *G06T 7/174* | (2017.01) | |
| *G01B 11/02* | (2006.01) | |
| *G06K 9/62* | (2006.01) | |
| *H04N 5/225* | (2006.01) | |

(52) U.S. Cl.
CPC .............. *G06T 7/13* (2017.01); *G01B 11/022* (2013.01); *G01B 11/028* (2013.01); *G06K 9/6215* (2013.01); *G06T 7/174* (2017.01); *H04N 5/2256* (2013.01); *G06T 2207/10016* (2013.01); *G06T 2207/10024* (2013.01); *G06T 2207/10152* (2013.01); *G06T 2207/30108* (2013.01)

(58) Field of Classification Search
CPC . G06T 7/13; G06T 7/174; G06T 2207/10152; G01B 11/028; H04N 5/2256
See application file for complete search history.

(56) References Cited

U.S. PATENT DOCUMENTS

| | | | | |
|---|---|---|---|---|
| 2010/0309309 A1* | 12/2010 | Bing | ..................... | G01B 11/046 348/128 |
| 2012/0051622 A1* | 3/2012 | Gyoda | ..................... | G03F 7/705 382/144 |
| 2013/0182897 A1* | 7/2013 | Holz | ...................... | G06T 7/586 382/103 |

(Continued)

FOREIGN PATENT DOCUMENTS

| | | |
|---|---|---|
| JP | 03-225212 | 10/1991 |
| JP | 05-296715 | 11/1993 |

(Continued)

*Primary Examiner* — Solomon G Bezuayehu
(74) *Attorney, Agent, or Firm* — Oblon, McClelland, Maier & Neustadt, L.L.P.

(57) ABSTRACT

According to one embodiment, an edge detection device includes a light source, an imaging part, and a detector. The light source includes at least three light-emitting parts for irradiating a plurality of objects adjacent with a light. The imaging part images a surface of the objects irradiated by each of the light-emitting parts, and generates a plurality of image data of the surface. The detector detects edges of the surface imaged, based on at least two different combinations of the plurality of image data.

9 Claims, 16 Drawing Sheets

(56) References Cited

U.S. PATENT DOCUMENTS

| | | | |
|---|---|---|---|
| 2014/0333939 A1* | 11/2014 | Merettig | G01B 11/028 |
| | | | 356/614 |
| 2014/0347358 A1 | 11/2014 | Raunio et al. | |
| 2015/0029326 A1* | 1/2015 | Backman | G02B 21/365 |
| | | | 348/80 |
| 2015/0278594 A1* | 10/2015 | Copsey | G06K 9/00912 |
| | | | 382/112 |
| 2016/0267668 A1* | 9/2016 | Yamada | G01B 11/2509 |
| 2017/0215550 A1* | 8/2017 | Walia | A45D 29/22 |

FOREIGN PATENT DOCUMENTS

| | | |
|---|---|---|
| JP | 11-153411 | 6/1999 |
| JP | 11-179288 | 7/1999 |
| JP | 2001-183113 | 7/2001 |
| JP | 2014-038045 | 2/2014 |

\* cited by examiner

EDGE DETECTION DEVICE, AN EDGE DETECTION METHOD, AND AN OBJECT HOLDING DEVICE

CROSS-REFERENCE TO RELATED APPLICATION

This application is based upon and claims the benefit of priority from Japanese Patent Application No. 2016-200197, filed on Oct. 11, 2016, and Japanese Patent Application No. 2017-162757, filed on Aug. 25, 2017; the entire contents of which are incorporated herein by reference.

FIELD

Embodiments described herein relate generally to an edge detection device, an edge detection method, and an object holding device.

BACKGROUND

Presently, in distribution and logistics industry, by spread of mail-order market, the handling amount of objects has tendency to increase. As a result, each logistics company copes with automation of the logistics system.

As to conveyance and safekeeping of objects in warehouse, automation using belt-conveyer is progressed. However, as to transfer working (such as depalletizing and picking) to move objects to another place, automation is difficult, and an idea to automate is necessary. In order to automate the transfer working, correctly-detection of loading status and location status of objects is very important. As the detection method, by irradiating from each of a plurality of light sources to objects, and by imaging a reflected light from the objects by two-dimensional image sensor (and so on), edges and boundaries of the objects are detected from the image. In this method, for example, if a plurality of objects is adjacent and located three-dimensionally, edges and boundaries thereof cannot be correctly detected. Accordingly, even if the plurality of objects is adjacently located, a device able to correctly detect edges and boundaries thereof is desired.

DETAILED DESCRIPTION

Figure 1:
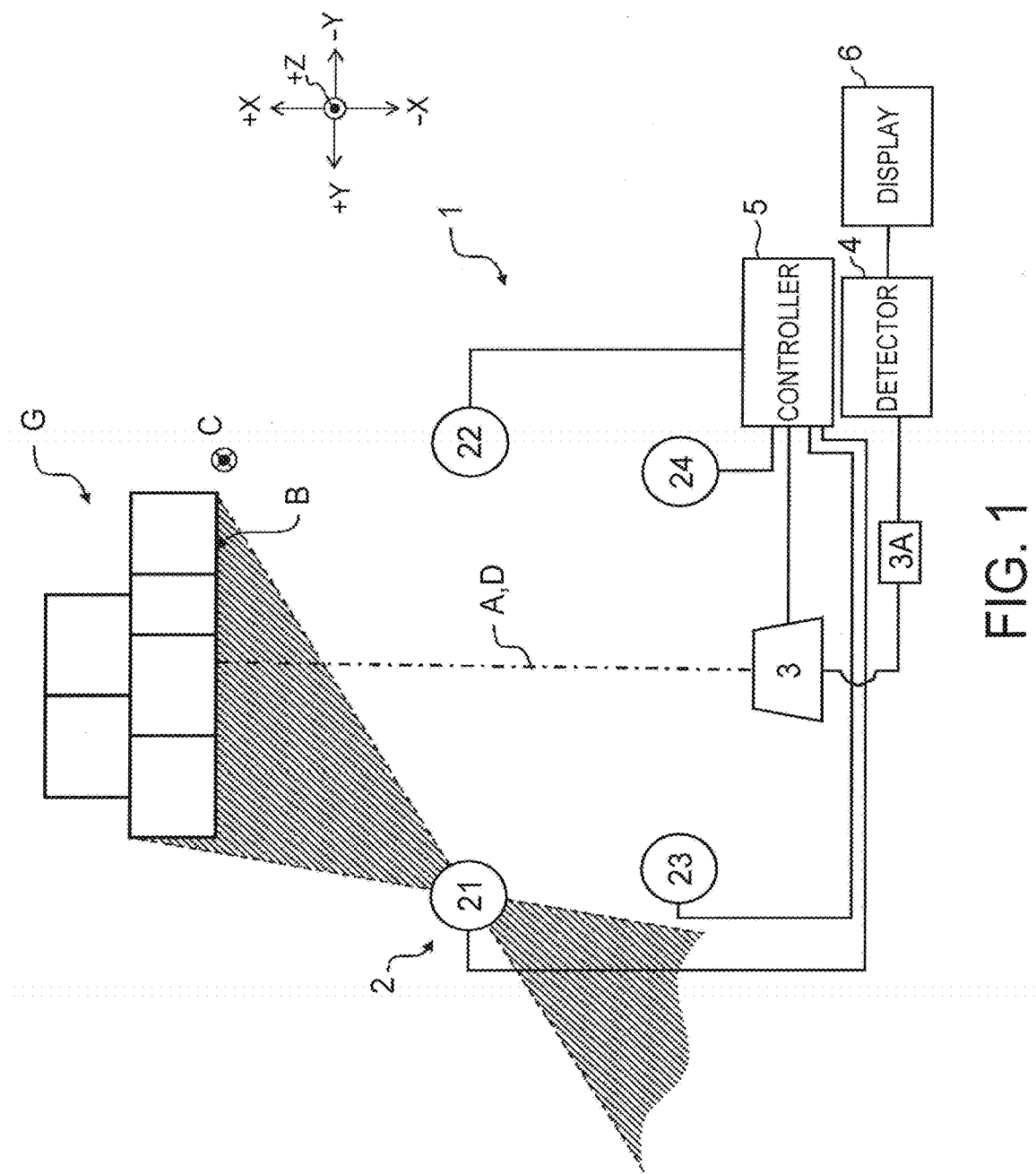
FIG. 1 is a top view showing one example of an edge detection device 1 according to the first embodiment.

According to one embodiment, an edge detection device includes a light source, an imaging part, and a detector. The light source includes at least three light-emitting parts for irradiating a plurality of objects adjacent with a light. The imaging part images a surface of the objects irradiated by each of the light-emitting parts, and generates a plurality of image data of the surface. The detector detects edges of the surface imaged, based on at least two different combinations of the plurality of image data.

Hereinafter, an edge detection device according to embodiments are described below with reference to drawings. Having the same reference numeral means the same component. Incidentally, the drawings are schematic or conceptual, a relationship between the thickness and width of each part, the dimensional ratio between parts, etc. are not necessarily the same as actual ones. Furthermore, even the same part may be depicted in the different dimensions or dimensional ratio among the drawings.

The First Embodiment

The first embodiment will be explained by referring to FIG. 1. FIG. 1 is a top view showing one example of the edge detection device 1 according to the first embodiment.

As shown in FIG. 1, a plurality of objects G is placed opposite to the edge detection device 1.

Here, in order to simplify explanation, +X-direction, −X-direction, +Y-direction, −Y-direction, +Z-direction, and −Z-direction will be defined. For example, +X-direction, −X-direction, +Y-direction, and −Y-direction, are directions approximately parallel to a horizontal plane. −X-direction is a direction opposite to +X-direction. In the first embodiment, +X-direction is a direction along which the objects G is positioned for the edge detection device 1. As shown in FIG. 1, the direction along which the objects G is positioned for the edge detection device 1 is a direction from the edge detection device 1 to the objects G. +Y-direction is a direction crossing +X-direction (For example, approximately-perpendicular direction). −Y-direction is a direction opposite to +Y-direction. +Z-direction is a direction crossing +X-direction and +Y-direction (For example, approximately-perpendicular direction), i.e., approximately-vertical upward direction. As shown in FIG. 1, +Z-direction is a direction along this side of the paper (FIG. 1). −Z-direction is a direction opposite to +Z-direction, for example, approximately-vertical downward direction.

The plurality of objects G is adjacently located, for example, placed on a shelf. Alternatively, they may be placed on a pallet, a basket carriage, or a box pallet. The objects G may be loaded in a pile. Furthermore, a shape of the object G is a cuboid or a cube. For example, it is a cardboard box or a container in which commodities are packed. The shape of the object G is not limited to the cuboid and so on. It may be a polyhedron.

An edge of the object G is an edge portion or a boundary of face of the object. The edge is not all of edge parts or boundaries of some face of the object, and includes a part thereof. Namely, if a shape of the face is a rectangle, the edge may be any of an edge along a vertical direction and an edge along a horizontal direction. Furthermore, among a plurality of faces forming the object, the edge includes a corner, a border and an edge where two faces contact.

As shown in FIG. 1, the edge detection device 1 equips a light source 2, an imaging part 3, a detector 4, a controller 5, and a display 6. The light source 2 irradiates the plurality of objects G with a light. The imaging part 3 images faces of the plurality of objects G (irradiated by each light-emitting part 21~24 of the light source 2), and acquires a plurality of image data as the imaging result. The detector 4 detects edges of faces of the objects G imaged, based on the plurality of image data. The controller 5 controls driving of the light source 2 and the imaging part 3. The display 6 displays edge information of the objects G (detected by the detector 4).

The edge detection device 1 detects edges of face from image data of the face of the plurality of objects G (imaged). Here, the face is a face among the plurality of objects G, which is irradiated by the light source. The edge detection device 1 detects a part where brightness suddenly changes from the image data, and detects this part as an edge of the object.

In the first embodiment, the light source 2 includes four light-emitting parts 21~24. The light-emitting parts 21~24 irradiate the plurality of objects G with a light, and each of the light-emitting parts 21~24 is located at different positions. The light-emitting parts 21~24 respectively irradiate at different timings, and irradiate the plurality of objects G with a light.

As shown in FIG. 1, the light-emitting parts 21~24 are located so as to be opposing the objects G, and irradiate a region including a face B of the objects G with a light. The face B of the objects G is a face imaged by the imaging part 3 as a detection target of edges of the objects G. The region including the face B is not limited to the face B of the objects G opposing the light source 2. The face B includes other face and region of the objects (except for the face B) to be irradiated. The light-emitting parts 21~24 are located so as to put a plane D therebetween. The plane D includes a line segment A (chain line) connecting the objects G with the imaging part 3, and is in parallel to a direction C of edges to be detected. The line segment connecting the objects G with the imaging part 3 may be a line segment connecting one of the objects G with the imaging part 3, or a line segment connecting a center of a distance between one end and the other end of the objects G (aligned along Y-direction) with the imaging part 3. Furthermore, the light source 2 may be located at the side along −X-direction than the imaging part 3. Namely, the line segment includes a line extending from the objects G through the imaging part 3.

The direction of edges to be detected is a direction of detectable edges, based on locations of the light-emitting parts 21~24 (explained afterwards). In the first embodiment, it corresponds to the direction C of edges in FIG. 1. The plane D is a face including the line segment A and in parallel to the direction C. "so as to put a plane D therebetween" means, the light-emitting parts are classified into two groups (or two sets), and are located so as to put the plane D between two classes. For example, in the case of four light-emitting parts as shown in FIG. 1, they are preferably classified by twos, and located so as to put the plane D therebetween. Furthermore, four-emitting parts may be classified into one part and three parts, and located so as to put the plane D therebetween. The light-emitting parts 21 and 23 are located at a region (it is called a first region) along +Y-direction for the plane D. The light-emitting part 21 is located near the objects G, and the light-emitting part 23 is located at the side along −X-direction from the light-emitting part 21. On the other hand, the light-emitting parts 22 and 24 are located at a region (it is called a second region) along −Y-direction for the plane D. The light-emitting part 22 is located near the objects G, and the light-emitting part 24 is located at the side along −X-direction from the light-emitting part 22. The light source 2 (four light-emitting parts 21~24) are preferably located at a width wider than a width of the objects G along Y-direction. For example, in the case of viewing the objects G from −X-direction, two light-emitting parts 21 and 23, and two light-emitting parts 22 and 24, are preferably located so as to put the plane D therebetween.

As shown in FIG. 1, the light-emitting parts 21~24 respectively irradiate the objects G with a light. Accordingly, while one light-emitting part is irradiating the objects G with a light, other light-emitting parts are located so as not to enter into an irradiated region of the one light-emitting part. Here, the irradiated region is a region formed by a projection line where the objects G are perspectively projected by one light-emitting part (viewpoint). In FIG. 1, a broken line is the projection line of the light-emitting part 21, and a hutching part is the irradiated region.

Location of the light-emitting parts 21~24 will be explained in detail. Here, for the plane D including the line segment A (connecting a center of objects G aligned along Y-direction with the imaging part 3) and in parallel to the direction C of edges, two light-emitting parts 21 and 23, and two light-emitting parts 22 and 24, are almost symmetrically located. First, by setting a location of the light-emitting part 21 to a reference, the light-emitting part 23 is located at outside of the irradiated region (hutching part in FIG. 1) of the light-emitting part 21. This reason is, if the light-emitting part 23 is located in the irradiated region, when the light-emitting part 23 irradiated the objects G with a light, a shadow of the light-emitting part 21 is reflected onto the objects G, and the image data includes a false signal. The false signal is a signal except for desired signal, i.e., a noise component. Moreover, locations of other light-emitting parts 22 and 24 are same as those of the light-emitting parts 21 and 23. Furthermore, a distance from the objects G to the light-emitting parts 21 and 23 is preferably equal to a distance from the objects G to the light-emitting parts 22 and 24. Furthermore, two light-emitting parts 21 and 23, and two light-emitting parts 22 and 24, are not always symmetric to the plane D.

As the light-emitting parts 21~24 of the light source 2, an incandescent lamp, a halogen lamp, a fluorescent light, a discharge lamp, e.g., LED (light emitting diode), can be used. However, the light-emitting parts 21~24 are not limited to them. Furthermore, a shape of the light source 2 may be separated into a plurality of units, or formed as one body. For example, if the light source 2 is separated into four units (e.g., four incandescent lamps are located), the four units may be respectively a light-emitting part. Furthermore, if the light source 2 is formed as one body (e.g., LED board capable of lighting from each position thereof), four parts (each lighting differently) of the light source 2 may be respectively a light-emitting part. Furthermore, if the light source is separated into two units (e.g., LED is located to be rod-like, and two line lights (each having a predetermined part capable of lighting) are aligned), the respective predetermined part of two line lights may be two light-emitting parts. In above explanation, the light source 2 includes by four light-emitting parts 21~24. However, the light source 2 is not limited to this component. The light source 2 may include three light-emitting parts or five (or more than five) light-emitting parts. Furthermore, in above explanation, the light source 2 is located on the same plane as (or a plane in parallel to) a plane where the objects G are place. However, the plane on which the light source 2 is not limited to them.

The imaging part 3 images the plurality of objects G irradiated by each light-emitting part 21~24, and acquires respective image data. The image data corresponds to the imaging result which the imaging part 3 images the objects G and circumference thereof. For example, image data generally used such as RAW data, jpg, gif, png or bmp, may be applied.

As shown in FIG. 1, the imaging part 3 is located at the side (opposing the objects G) where the light source 2 is positioned. Namely, the imaging part 3 is located along −X-direction for the objects G, and images a face B of the objects G from −X-direction. The imaging part 3 is preferably located at a position apart from a center of the objects G (aligned along Y-direction) toward −X-direction. The imaging part 3 acquires image data when the light-emitting parts 21~24 respectively irradiate the objects G. Specifically speaking, in the first embodiment, the number of light-emitting parts is four, and the number of image data is also four. Namely, the number of image data is equal to the number of light-emitting parts, but not limited to this. The image data is images including at least face B of the objects G (opposing the imaging part 3). The image data is stored in storage 3A of the imaging part 3. For example, as the storage 3A, a tape system such as a magnetic tape or a cassette tape, a disk system such as a magnetic disk (floppy disk (registered trade mark)/hard disk) or an optical disk (CD-ROM/MO/MD/DVD/CD-R), a card system such as an IC card (including a memory card) or an optical card, and a semiconductor memory system such as a mask ROM/EPROM/EEPROM/flash ROM, may be used. The imaging part 3 may use a memory (to store the image data) installed at the outside.

The imaging part 3 includes an optical system such as a camera, a CCD (Charge Coupled Device) sensor, or an imaging element such as a CMOS sensor (Complementary Metal Oxide Semiconductor).

The imaging part 3 may include one camera. However, the imaging part 3 is not limited to this component.

The detector 4 detects edges of the face B of the objects G, based on a plurality of image data imaged by the imaging part 3. The edges are a border, an outline, or a boundary having uneven shape on the face B of the objects G. In the image data, a part where brightness suddenly changes corresponds to the edges.

Figure 2:
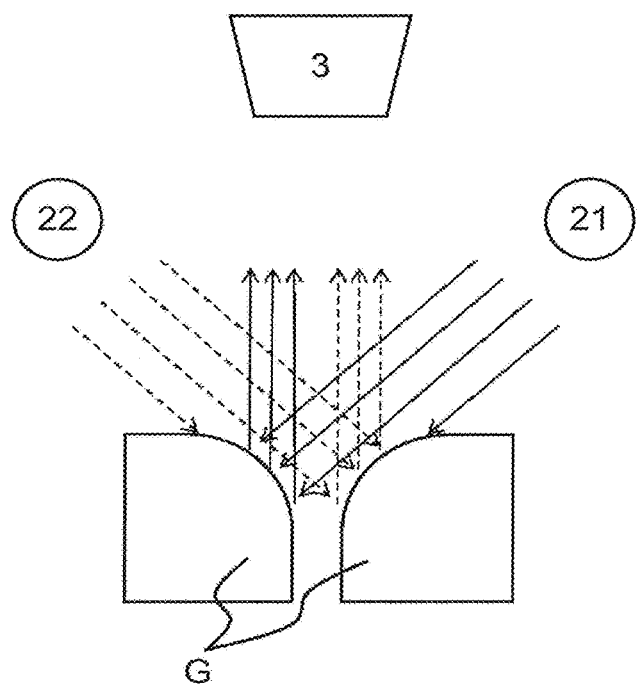
FIG. 2 is an enlarged view showing one example of imaging parts and edges of two objects on condition that lights are irradiated from different positions.

FIG. 2 is an enlarged view showing one example of imaging part 3 and edges of two objects on condition that two objects are irradiated from different positions. As shown in FIG. 2, a light from the light-emitting part 21 at the right side is represented as solid lines, and a light from the light-emitting part 22 at the left side is represented as broken lines. In FIG. 2, lights scattered at a surface (including edges) of objects and toward the imaging part 3 are only shown. In general, edges of objects (such as a cardboard box) are not a perfect right angle and include a slope or roundness. If the light-emitting part 21 irradiates the objects including such edges with a light, due to relationship of irradiation angle of the light, edges of the object located at the left side in FIG. 2 are shined by many lights, and these lights are scattered toward the imaging part 3. On the other hand, edges of the object located at the right side in FIG. 2 are hard to be shined by many lights. In the same way, if the light-emitting part 22 irradiates with a light, edges of the object located at the right side in FIG. 2 are shined by many lights, but edges of the object located at the left side in FIG. 2 are hard to be shined by many lights. If image data are acquired by irradiating from respective light-emitting parts located at right and left, two image data in which brightness of edges are different (due to position of the light-emitting part) are acquired. By calculating a difference between these two image data, a relative large difference occurs at the edges. Accordingly, the edges of the objects can be detected. The difference between two image data is acquired by comparing each pixel (two corresponding pixels) between two image data and by remaining different pixels therebetween. The comparing each pixel means, two corresponding pixels at the same pixel position between two image data are compared. For example, in the difference between two image data, a pixel position having the same pixel value therebetween is displayed blackly, and a pixel position having different pixel value therebetween is displayed whitely. Display with black and white may be reverse, or the pixel position may be displayed with another color.

Next, in the first embodiment, a method for detecting edges of the objects G by the detector 4 will be explained in detail.

In the first embodiment, the detector 4 detects edges of the objects G from four image data of the objects G irradiated respectively by four light-emitting parts (located at different positions). In order to simplify the explanation, while the light-emitting part 21 is lighting, an image acquired by the imaging part 3 is called image data 31 (not shown in Fig.). In the same way, while the light-emitting parts 22, 23 and 24 are lighting respectively, images acquired by the imaging part 3 are called image data 32, 33 and 34 (not shown in Fig.).

In addition to this, four image data 31~34 are classified into a first combination and a second combination.

Here, as for the plane D including the line segment A (connecting the objects G with the imaging part 3) and in parallel to the direction C of edges, one is selected from two image data 31 and 33 (irradiated by two light-emitting parts 21 and 23 located along +Y-direction), and one is selected from two image data 32 and 34 (irradiated by two light-emitting parts 22 and 24 located along −Y-direction). By combining the selected one, the first combination and the second combination are generated. For example, the first combination is image data 31 and image data 32, and the second combination is image data 33 and image data 34.

The reason for this combination is, if two image data acquired by imaging along the same direction are combined, as mentioned-above, difference does not occur at edges in the difference image. As a result, the edges of the objects G cannot be correctly detected.

Moreover, as the combination of image data, image data 31 and image data 34 may be the first combination, and image data 32 and image data 33 may be the second combination. Furthermore, by combining any of image data 31 and image data 33 with image data 32 or image data 34, the first combination and the second combination may be generated. Furthermore, by combining any of image data 32 and image data 34 with image data 31 or image data 33, the first combination and the second combination may be generated.

After generating the first combination and the second combination, in order to detect edges from each combination, by calculating a difference between two image data included in the same combination, a difference images of each combination is generated. After that, in order to remove a false signal, two pixel values at the same pixel position between two difference images are multiplied for each pixel. In this way, edges of the objects G are detected.

Hereinafter, processing after generating the first combination and the second combination will be explained in detail.

First, before acquiring the difference image, correction processing is performed to two image data (included in the same combination) so that brightness of low spatial frequency components of two image data is equal. For example, this processing is performed by following steps.

By averaging two image data (included in the same combination), reference image data is generated. Specifically, a sum of two pixel values (at the same pixel position) between two image data is calculated, and the sum is divided by two (step 1). In order to extract a low spatial frequency component of two image data, filtering by low pass filter is performed to each image data (step 2). The filtering by low pass filter is removing a high spatial frequency component higher than a predetermined spatial frequency component, e.g., a method used for blurring a fine pattern in the image. Furthermore, each of two images is divided by the filtered image data (generated at step 2) for each pixel. As to each image data divided, the reference image data (generated at step 1) is multiplied for each pixel position (step 3). The division of image data is processing to emphasize a different part and blur the same part in the image data. Furthermore, the multiplication of image data is processing to emphasize the same part and blur a different part in the image data.

As the reason for such correction of brightness, a noise component due to difference of brightness between two image data is remained in difference processing (explained afterwards). Accordingly, remaining of the noise component needs to be avoided. Moreover, a signal of edge to be detected represents a characteristic at high spatial frequency component. Accordingly, correction processing is performed to low spatial frequency component only.

Next, processing to emphasize edges of image data is performed to each image data. This reason is, as an edge adjacent part of the object, only part where change of brightness is relatively large needs be extracted. In this processing, for example, filtering is performed by a high pass filter such as Prewit filter, Sobel filter, or Roberts filter. The filtering by high pass filter is removing a low spatial frequency component lower than a predetermined spatial frequency. e.g., a method used for emphasizing a fine pattern in the image.

After performing above processing to two image data, a difference between two image data is calculated, and an absolute value of the difference is calculated. This series of processing is performed to the first combination and the second combination. As a result, image data having a characteristic at edge part is acquired for each combination. Here, in respective image data of the first combination and the second combination after above processing, a false signal (such as a boundary of shadow due to adjacent object, a reflected light) except for edge is also detected. This false signal is more notable in the case that a level difference exists at a face of the objects G (adjacently located) toward the side of the light source 2. Namely, in the case that a shape or a size of the objects G are not equal, or even if the shape and the size are equal, the objects G are aligned by shifting along X-direction, the false signal occurs. This false signal is not discriminated from edges, and erroneously detected as the edges. Accordingly, in order to reduce the false signal, two image data (acquired by above processing) are multiplied for each pixel position. As a result, the false signal component (such as a shadow due to adjacent objects, or a reflected light) can be reduced. In this processing, the fact that "a boundary of shadow due to adjacent objects, and a position where the reflected light occurs, is changed by a position of the light source 22" is utilized. Namely, a position of the false signal in image data acquired from the first combination is different from a position of the false signal in image data acquired from the second combination. Contrary to this, edges to be detected exist at the same position in respective image data acquired from the first combination and the second combination. Accordingly, by multiplying two image data (after above processing) for each pixel position, the edge signal is larger while the false signal is smaller.

As following processing, if necessary, elimination processing of isolated points (it is called Morphology operation) and thickening processing may be added. Furthermore, after that, binarization processing may be added. The binarization processing is processing to convert the image into two gradations (black and white). By setting a threshold, if a value of a pixel is above the threshold, the value of the pixel is replaced with a white pixel. If a value of a pixel is below the threshold, the value of the pixel is replaced with a black pixel.

In the edge detection device of the first embodiment, the light-emitting parts are located on the same plane where the objects G are placed. Accordingly, among edges of the objects G, an edge aligned along a direction perpendicular to the plane (where the light-emitting parts are located) can be notably detected. Namely, an edge aligned along Z-direction of the objects G can be detected. This means, a direction of notably-detectable edges is determined due to location of the light-emitting parts.

Figure 3:
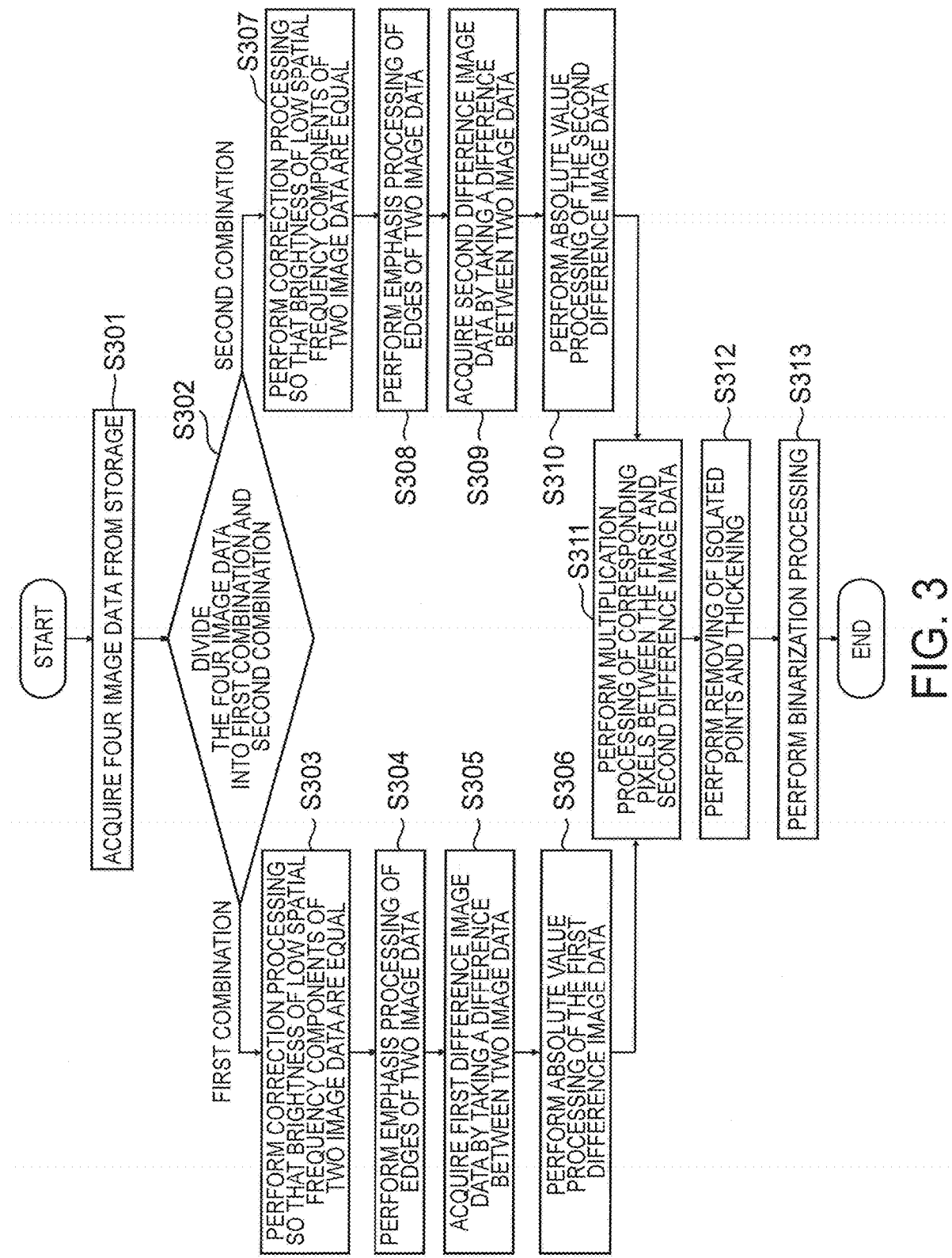
FIG. 3 is a flow chart of edge detection processing by a detector according to the first embodiment.

FIG. 3 is a flow chart of above-mentioned edge detection processing by the detector 4 according to the first embodiment.

First, the detector 4 acquires four image data from the storage 3A (S301). The detector 4 classifies the four image data into a first combination and a second combination (S302).

The first combination is two image data 31 and 32. The second combination is two image data 33 and 34.

As to two image data 31 and 32 of the first combination, correction processing is performed so that brightness of a low spatial frequency component thereof is equal (S303). As to two image data 31 and 32, edge emphasis processing is performed (S304). As to two image data 31 and 32, a difference therebetween is calculated, and a first difference image data is acquired (S305). As to the first difference image data, absolute value processing is performed (S306).

On the other hand, as to two image data 33 and 34 of the second combination, correction processing is performed so that brightness of a low spatial frequency component thereof is equal (S307). As to two image data 33 and 34, edge emphasis processing is performed (S308). As to two image data 33 and 34, a difference therebetween is calculated, and a second difference image data is acquired (S309). As to the second difference image data, absolute value processing is performed (S310).

Next, as to the first difference image data and the second difference image data, multiplication processing is performed for each pixel position (S311). As to the multiplied image data, elimination processing of isolated points and thickening processing are performed (S312). As to the acquired image data, binarization processing is performed (S313). In this way, in the objects G, edges at the face toward the light source 2 and the imaging part 3 are detected.

The multiplied image data is image data on which the false signal is blurred and only edges are emphasized.

For example, the detector 4 is packaged into a computer (equipping a processor and a memory) or LSI (large scale integration).

The controller 5 controls driving of the light source 2 and the imaging part 3. The driving is On/Off operation of each of four light-emitting parts 21~24 of the light source 2, and imaging operation of the imaging part 3. In order to image the objects G irradiated by each light-emitting part, the imaging part 3 operates based on On/Off of the light-emitting part. For example, on condition that only the light emitting-part 21 is "On" to irradiate the objects G with a light, the imaging part 3 is operated to image the objects G. Next, on condition that the light-emitting part 21 is "Off" and only the light emitting-part 22 is "On" to irradiate the objects G with a light, the imaging part 3 is operated to image the objects G. This operation is repeated for other light-emitting parts 23 and 24. The order of irradiation of the light-emitting parts 21~24 is not limited to this. The light-emitting parts 21~24 may irradiate in any order.

The controller 5 is a driver or a driver circuit to control operation of the light source 2 and the imaging part 3. The controller 5 can be packaged into a computer 8 (equipping a processor and a memory) or LSI. Furthermore, the controller 5 may be included in the detector 4.

The display 6 displays edge information (detected by the detector 4) of the face of the objects G opposing the light soured 2 and the imaging part 3. The edge information is image data including edges detected by the detector 4, or information which the image data is visually recognizable. As the display 6, a monitor of the computer, or an LCD monitor of a portable terminal, may be used. The display 6 is not necessary component for the edge detection device 1. The edge detection device 6 may not include the display 6.

Next, practical examples of the edge detection device according to the first embodiment will be explained by referring to FIGS. 4~7. As objects being an edge detection target, eight boxes are adjacently aligned in a lateral direction.

Figure 4:
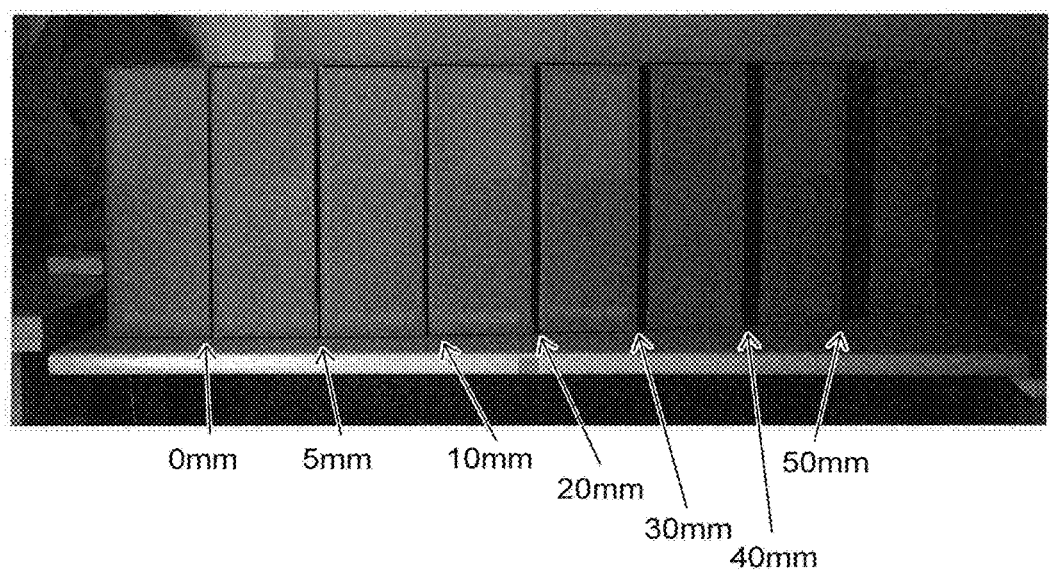
FIG. 4 is image data showing one example of location of a plurality of boxes (objects).

FIG. 4 shows an image in the case that a plurality of boxes (objects) is located by adding a level difference (gradually larger from left to right) to each box along a depth direction. As shown in FIG. 4, the level direction between adjacent two boxes is, from left, 0 mm, 5 mm, 10 mm, 20 mm, 30 mm, 40 mm, 50 mm.

Figure 5:
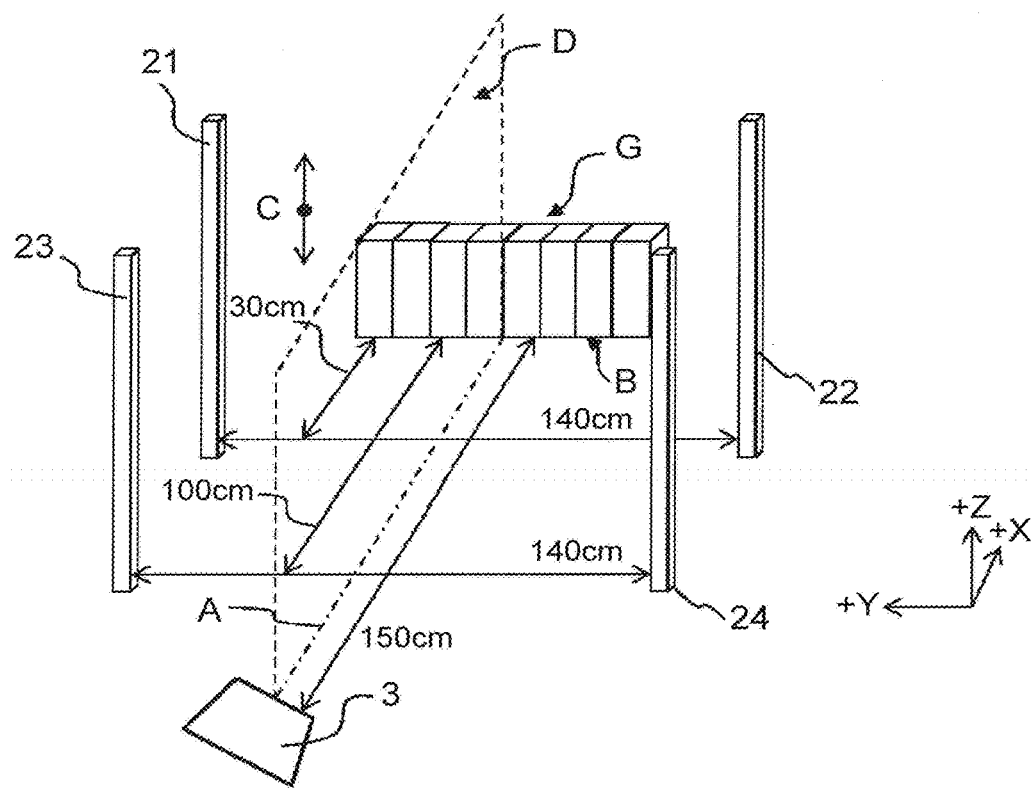
FIG. 5 is a schematic diagram showing location of light sources and the imaging part used for the first embodiment.

FIG. 5 is a schematic diagram showing location of light sources and the imaging part used for the first embodiment. As shown in FIG. 5, the imaging part 3 is located opposing the plurality of boxes along −X-direction. As the light source, four light-emitting parts 21~24 are used. Each light-emitting part is a line light-emitting part extending along Z-direction. As a distance from the boxes to the line light-emitting part, two light-emitting parts 21 and 22 are located at a position having 30 cm from the box along −X-direction. Furthermore, two light-emitting parts 23 and 24 are located at a position having 100 cm from the box along −X-direction. The light-emitting parts 21 and 22, and the light-emitting parts 23 and 24, are respectively located at an interval 140 cm. As to a plane D including a line segment A connecting a center of the boxes (aligned along Y-direction) with the imaging part 3, and in parallel to a direction C of edges to be detected, two light-emitting parts 21 and 23, and two light-emitting parts 22 and 24, are symmetrically located.

Figure 6:
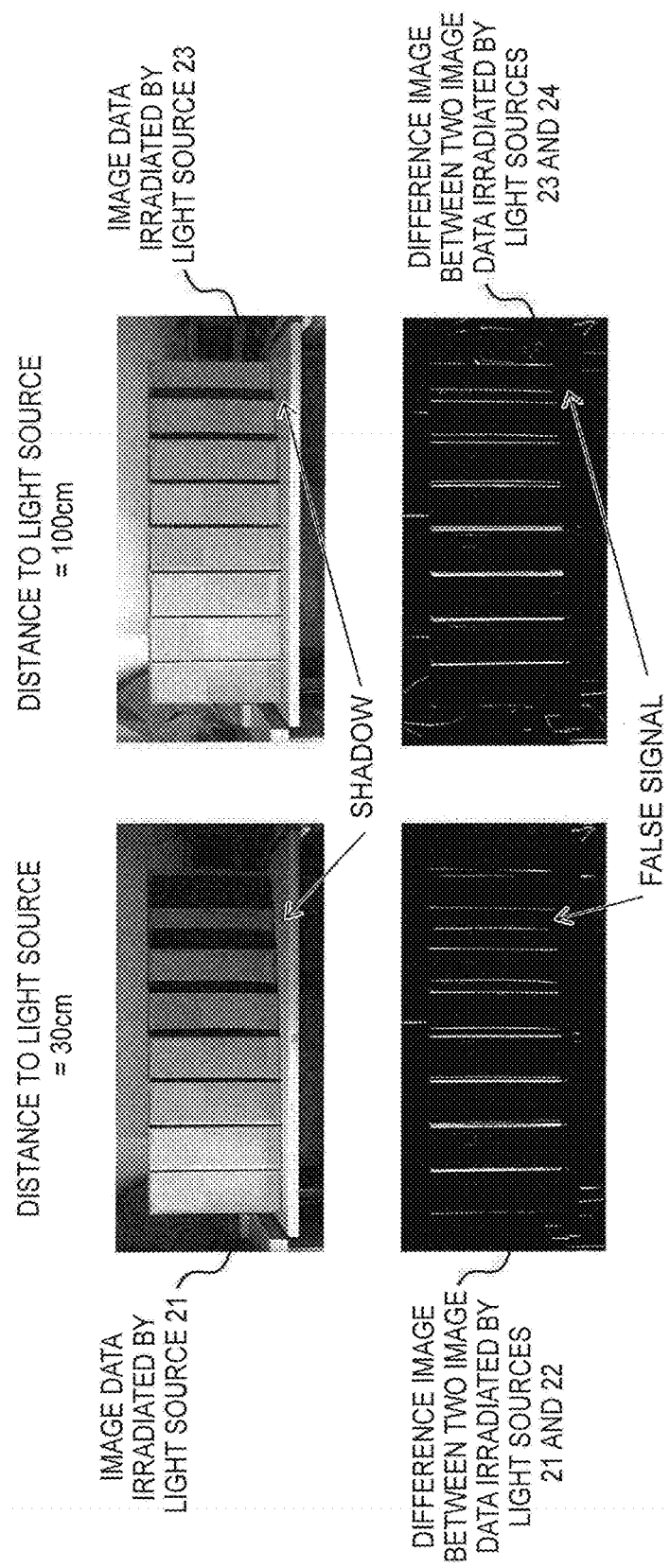
FIG. 6 is two image data acquired by irradiating from different light sources, and two difference images between respective image data.

FIG. 6 is two image data acquired by irradiating from the light-emitting parts 21 and 23, a difference between two image data acquired by irradiating from the light-emitting parts 21 and 22, and a difference between two image data acquired by irradiating from the light-emitting parts 23 and 24.

As shown in FIG. 6, in two image data acquired by irradiating from the light-emitting parts 21 and 23, a shadow of adjacent two boxes is imaged at a position where the two boxes are located with a level difference. A boundary of this shadow is detected from the difference image of the image data, and this boundary cannot be discriminated from edges to be detected. As a noteworthy fact, in the difference image in the case of distance 30 cm from the box to the light-emitting parts 21 and 22, and in the difference image in the case of distance 100 cm from the box to the light-emitting parts 23 and 24, respective positions of the boundary of the shadow are different.

Figure 7:
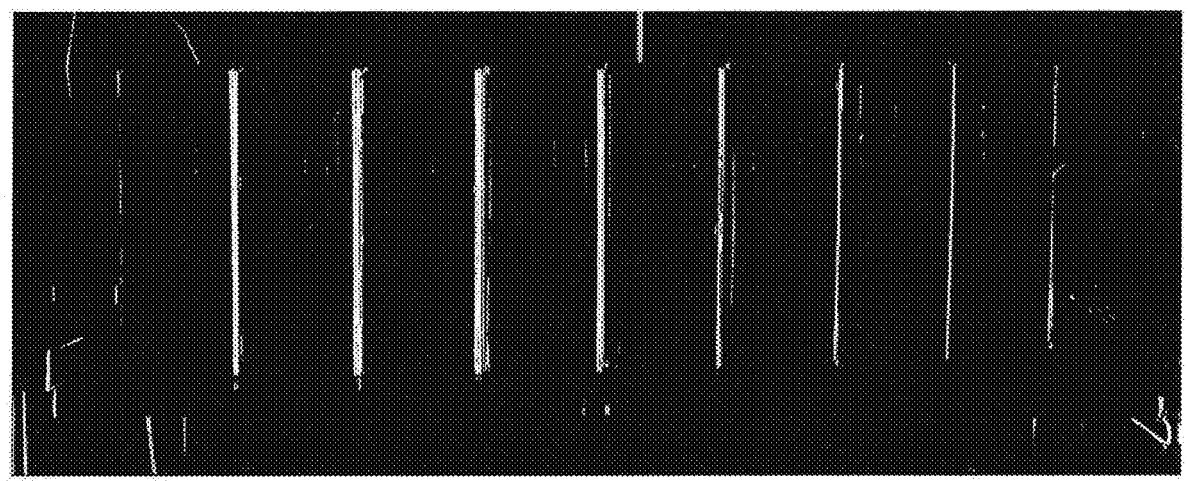
FIG. 7 is image data acquired by multiplying the two difference images.

FIG. 7 is image data acquired by multiplying the difference image (between two image data acquired by irradiating from the light-emitting parts 21 and 22) with the difference image (between two image data acquired by irradiating from the light-emitting parts 23 and 24).

By multiplying two difference images, false signals (due to the boundary of shadow) occurred at different positions are reduced, and edge signals are correctly acquired.

By the edge detection device of the first embodiment, influence of the false signal such as a shadow or a reflected light (occurred by adjacent objects) is reduced, and edges of the objects are correctly detected.

Furthermore, location of light-emitting parts 21~24 of the edge detection device 1 includes the case that at least one of the light-emitting parts is offset along X-direction or Y-direction, is included. In this case, the same effect is acquired.

In above explanation, as to the plane D including the line segment A connecting a center of the objects G with the imaging part 3 and in parallel to the direction C of edges to be detected, four light-emitting parts are located along +Y-direction and −Y-direction by twos. However, one (light-emitting part 21) may be located along +Y-direction, and three (light-emitting parts 22~24) may be located along −Y-direction. In this case, while the light-emitting part 21 is lighting, an image acquired by the imaging part 3 is image data 31. In the same way, while the light-emitting parts 22, 23 and 24 are lighting differently, images acquired by the imaging part 3 are image data 32, 33 and 34. Here, two image data 31 and 32 may be the first combination. Two image data 31 and 33, or two image data 31 and 34, may be the second combination. Furthermore, two image data 31 and 33 may be the first combination, and two image data 31 and 34, may be the second combination. Furthermore, three (light-emitting parts 21, 23, 24) may be located along +Y-direction, and one (light-emitting part 22) may be located along −Y-direction. In this case, the first combination and the second combination are same as above-mentioned combinations.

In above explanation, combination of two image data is the first combination and/or the second combination. However, the number of image data to be combined is not limited to two. Combination of three image data (or image data more than three) may be the first combination and/or the second combination.

Furthermore, in above explanation, from image data of objects irradiated respectively by the light-emitting parts (located at different positions), the first combination and the second combination are selected. However, the number of combinations is not limited to two, and may be plural number larger than two. Among a plurality of combinations, a difference image between two image data by twos is calculated, and multiplication processing is performed to two difference images. In this case, edges of objects can be detected.

The Second Embodiment

Figure 8:
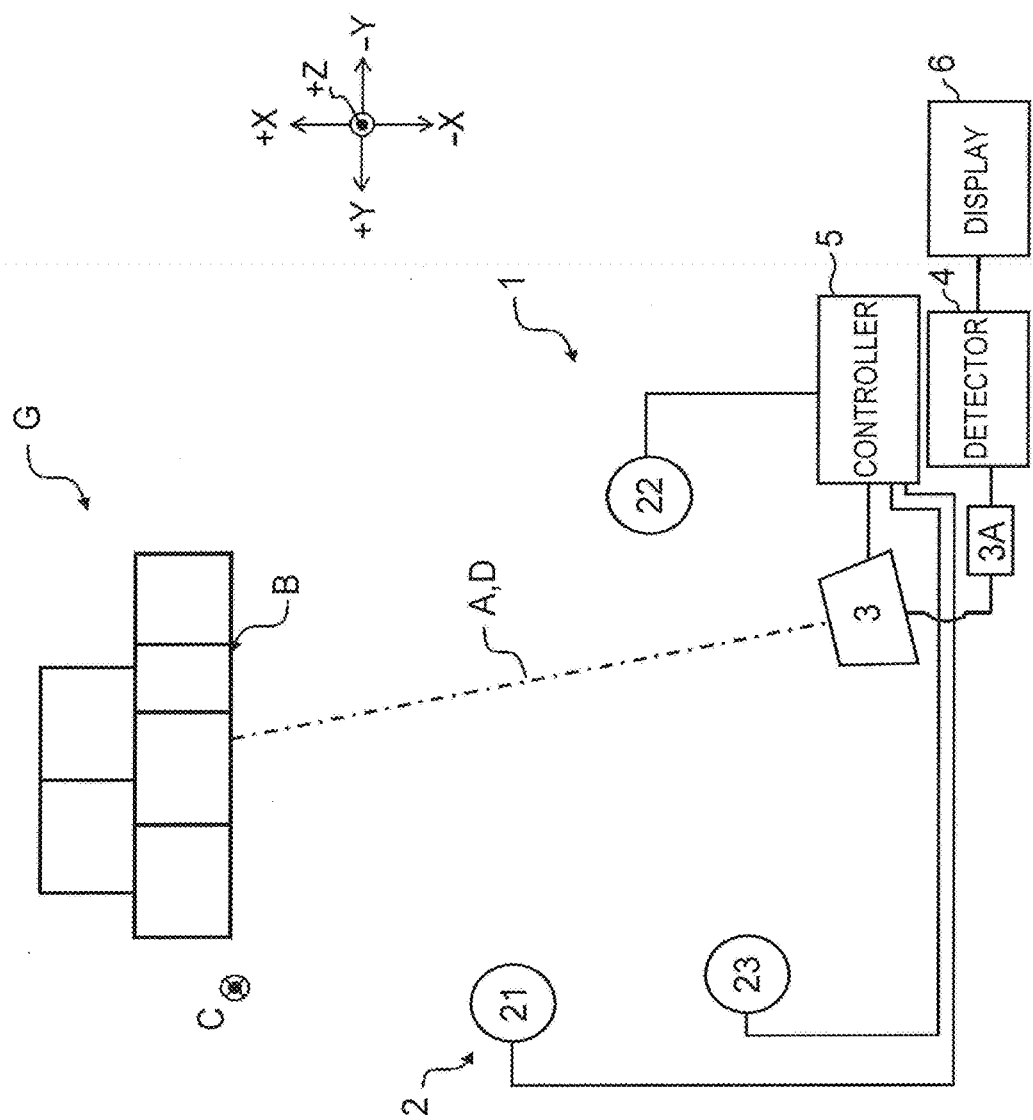
FIG. 8 is a top view showing one example of the edge detection device 1 according to the second embodiment.

The second embodiment will be explained by referring to FIG. 8. FIG. 8 is a top view showing one example of the edge detection device 1 according to the second embodiment.

As shown in FIG. 8, in the edge detection device 1, the light source 2 includes three light-emitting parts 21~23. Other components are same as those of the edge detection device 1 of the first embodiment.

The light-emitting parts 21~23 are located on the same plane as (or a plane in parallel to) a plane where a plurality of objects G is placed. The imaging part 3 is located so as to be opposing the objects G along −X-direction. As to a plane D including a line segment A connecting the objects G with the imaging part 3 and in parallel to a direction C of edges to be detected, two light-emitting parts 21 and 23 are located at a side along +Y-direction, and one light-emitting part 22 is located at a side along −Y-direction. Location of the light-emitting parts 21~23 is not limited to this location. As to the plane D, two light-emitting parts 21 and 23 may be located at the side along −Y-direction, and one light-emitting part 22 may be located at the side along +Y-direction.

The imaging part 3 is preferably located so that a distance to the light-emitting part 22 therefrom is shorter than a distance to the light-emitting parts 21 and 23 therefrom. As a result, it is avoided that a reflected light by the light-emitting part 22 is directly imaged by the imaging part 3. Accordingly, even if one light-emitting part 22 is located at the side along −Y-direction, a false signal due to the reflected light can be reduced. If the imaging part 3 is located so as not to occur the reflected light by the light-emitting part 22, a reflected light by the light-emitting part located at the side along +Y-direction is often imaged by the imaging part 3. Accordingly, two light-emitting parts 21 and 23 are located at the side along +Y-direction.

While the light-emitting part 21 is lighting, an image acquired by the imaging part 3 is image data 31 (not shown in FIG. 8). In the same way, while the light-emitting part 22 and 23 are lighting, respective images acquired by the imaging part 3 are image data 32 and 33 (not shown in FIG. 8).

Among three image data 31~33, the detector 4 selects a first combination having two image data 31 and 32, and a second combination having two image data 32 and 33. Following processing to detect edges is same as that of the first embodiment.

Three light-emitting parts 21~23 may not be controlled to light in order and to image the objects G irradiated by each light-emitting part. For example, if three light-emitting parts irradiate with respective lights having different wavelengths (red, green, blue), by using color image sensors (red, green, blue), the objects G can be imaged on condition that three light-emitting parts simultaneously irradiate with a light. The wavelength of light is preferably within a range larger than (or equal to) 400 nm and smaller than (or equal to) 2000 nm for each light-emitting part. Furthermore, desirably, the wavelength is larger than (or equal to) 400 nm and smaller than (or equal to) 780 nm.

In the edge detection device 1 of the second embodiment, by reducing the number of light emitting parts to three, cost-down due to reduction of the number of parts, and reduction of processing time to detect edges, can be planned.

In above explanation, the number of light-emitting parts is three. However, the number of light-emitting parts may be one or two. In this case, by preparing a moving mechanism for the light-emitting part, the same effect as the case of three or four light-emitting parts can be acquired. For example, if the source light 2 includes two light-emitting parts 21 and 22, one of two light-emitting parts 21 and 22 is moved to a position where the light-emitting part 23 is located in the second embodiment. As the moving mechanism, the light-emitting part may be moved by equipping wheels or by using a rail (previously installed). Furthermore, by using a linear motion mechanism of an electric slider loading a stepping motor, the light-emitting part may be moved. Furthermore, an electric cylinder may be used instead of the electric slider. After moving, by acquiring image data of the objects irradiated by the imaging part 3, the same image data as the case of irradiating by the light-emitting part 23 can be acquired. Moving of the light-emitting part is controlled by the controller 5 and so on. In the case of one light-emitting part, by moving this light-emitting part in the same way, the case of three or four light-emitting parts can be substituted therewith.

The Third Embodiment

Figure 9:
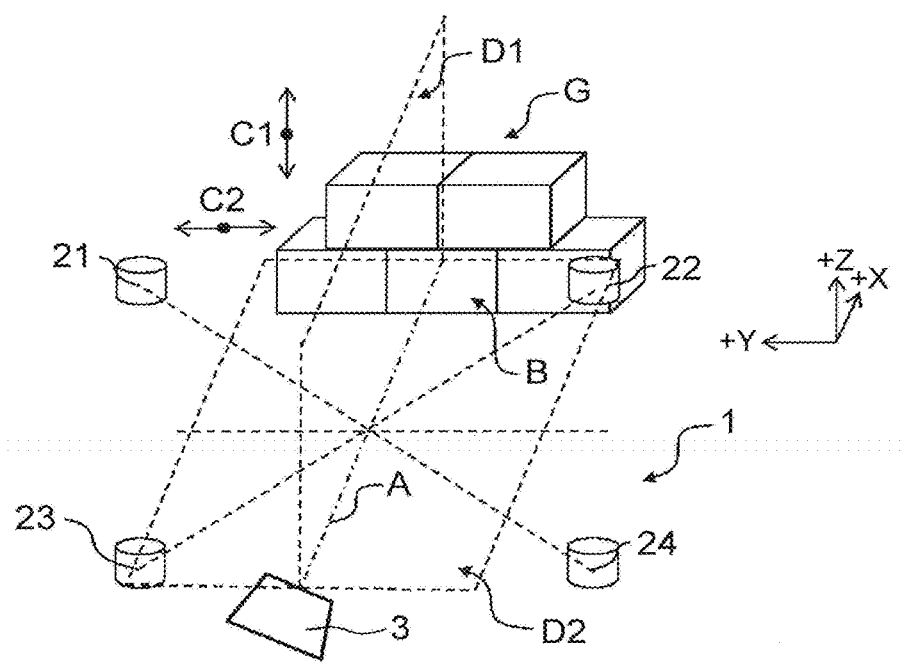
FIG. 9 is a top view showing one example of the edge detection device 1 according to the third embodiment.

The third embodiment will be explained by referring to FIG. 9. FIG. 9 shows one example of the edge detection device 1 according to the third embodiment.

As shown in FIG. 9, in the edge detection device 1, the light source 2 includes four light-emitting parts 21~24. The light source 2 is located on a plane approximately perpendicular to the line segment A (connecting the objects G with the imaging part 3). Other components are same as those of the edge detection device 1 of the first embodiment.

In FIG. 9, the light-emitting parts 21~24 are located on a plane approximately in parallel to YZ-plane with a predetermined distance along −X-direction from a plurality of objects G. Namely, the light-emitting parts 21~24 are located on a plane approximately in parallel to a face B (of the objects G) toward the side of the light source 2. The imaging part 3 is located to be opposing the objects G along −X-direction. As to a plane D1 including a line segment A (connecting the objects G with the imaging part 3) and in parallel to a direction C1 of edges to be detected, the light-emitting parts 21~24 are located so as to put the plane D1 therebetween. In this case, the direction C1 is Z-direction. As to the plane D1, two light-emitting parts 21 and 23 are located at the side along +Y-direction, and two light-emitting parts 22 and 24 are located at the side along −Y-direction.

Furthermore, in the case of location of the light-emitting parts according to the third embodiment, edges along Y-direction can be detected. As to a plane D2 including a line segment A (connecting the objects G with the imaging part 3) and in parallel to a direction C2 of edges to be detected, the light-emitting parts 21~24 are located so as to put the plane D2 therebetween. Namely, as to the plane D2, two light-emitting parts 21 and 22 are located at the side along +Z-direction, and two light-emitting parts 23 and 24 are located at the side along −Z-direction. Preferably, distances from the plane D1 (or the plane D2) to each light-emitting part are approximately equal. Because, if possible, brightness (illuminance) by which each light-emitting part irradiates the objects G are desirably equal.

While the light-emitting part 21 is lighting, an image acquired by the imaging part 3 is image data 31 (not shown in FIG. 9). In the same way, while the light-emitting part 22, 23 and 24 are lighting, respective images acquired by the imaging part 3 are image data 32, 33 and 34 (not shown in FIG. 9).

In the third embodiment, the detector 4 selects a first combination having two image data 31 and 34, and a second combination having two image data 32 and 33. Among location of the light-emitting parts 21~24, by combining respective image data acquired by irradiating from two light-emitting parts located along a diagonal direction, edges along Y-direction (lateral direction) and Z-direction (vertical direction) of the objects G can be detected. Following processing to detect edges using the first combination and the second combination is same as that of the edge detection device of the first embodiment.

Moreover, if two image data 31 and 33 are selected as the first combination, and if two image data 32 and 34 are selected as the second combination, edges of the objects G along Y-direction can be effectively detected. Furthermore, if two image data 31 and 32 are selected as the first combination, and if two image data 33 and 34 are selected as the second combination, edges of the objects G along Z-direction can be effectively detected.

The light-emitting parts 21~24 are preferably located at outside than a region where the objects G are positioned, from −X-direction to view the objects G. Here, the region where the objects G are positioned is a region that the objects G are projected onto each place where the light-emitting parts 21~24 are positioned.

The light-emitting parts 21~24 are preferably located at a region between the objects G and the imaging part 3. However, locations of the light-emitting parts 21~24 are not limited to this location. The light-emitting parts 21'24 may be located at a position far from the imaging part 3 along −X-direction. Namely, locations thereof may be suitably changed based on usage environment.

In above explanation, the light-emitting parts 21~24 are located on a plane approximately in parallel to YZ-plane. However, locations thereof are not limited to this plane. At least one of the light-emitting parts 21~24 may be offset along X-direction. Furthermore, at least one of the light-emitting parts 21~24 may be offset along Y-direction or Z-direction.

In above explanation, the number of light-emitting parts is four. However, the number of light-emitting parts may be at least three.

In the edge detection device 1 of the third embodiment, by locating the light-emitting parts on a plane in parallel to a face of the objects G to be imaged by the imaging part, edges along all (XYZ) directions can be detected depending on combinations of the image data.

Furthermore, in the edge detection device 1 of the third embodiment, edges along a predetermined direction can be detected.

Furthermore, in the edge detection device 1 of the third embodiment, by locating the light-emitting parts along a vertical direction (Z-direction), compact device design can be realized without useless space.

The Fourth Embodiment

Figure 10A:
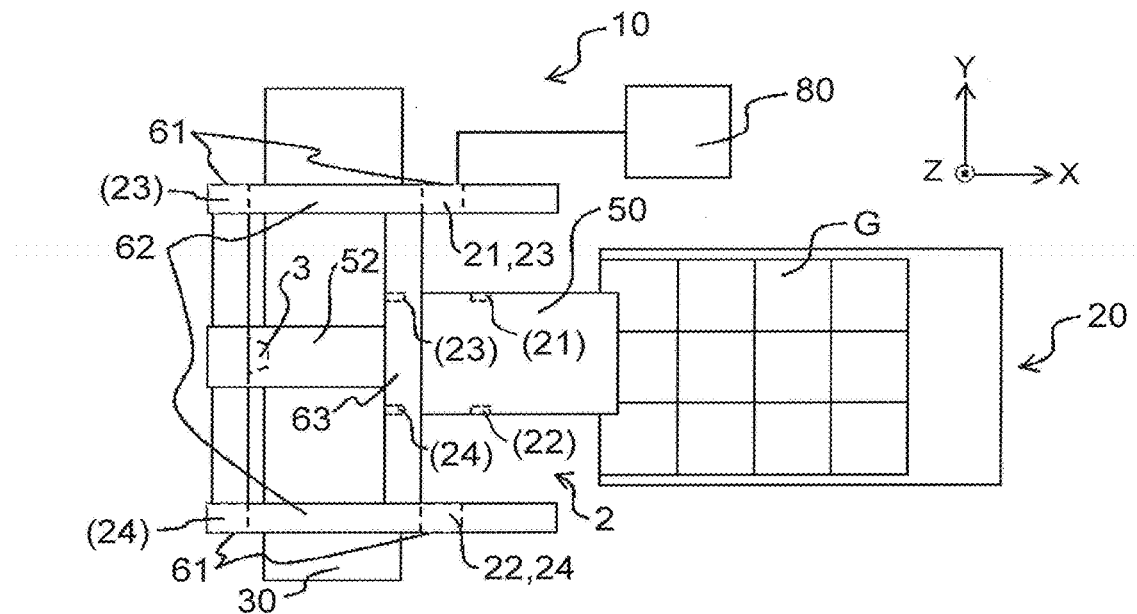
FIGS. 10A and 10B are a top view and a front view showing one example of an object holding device according to the fourth embodiment.
Figure 10B:
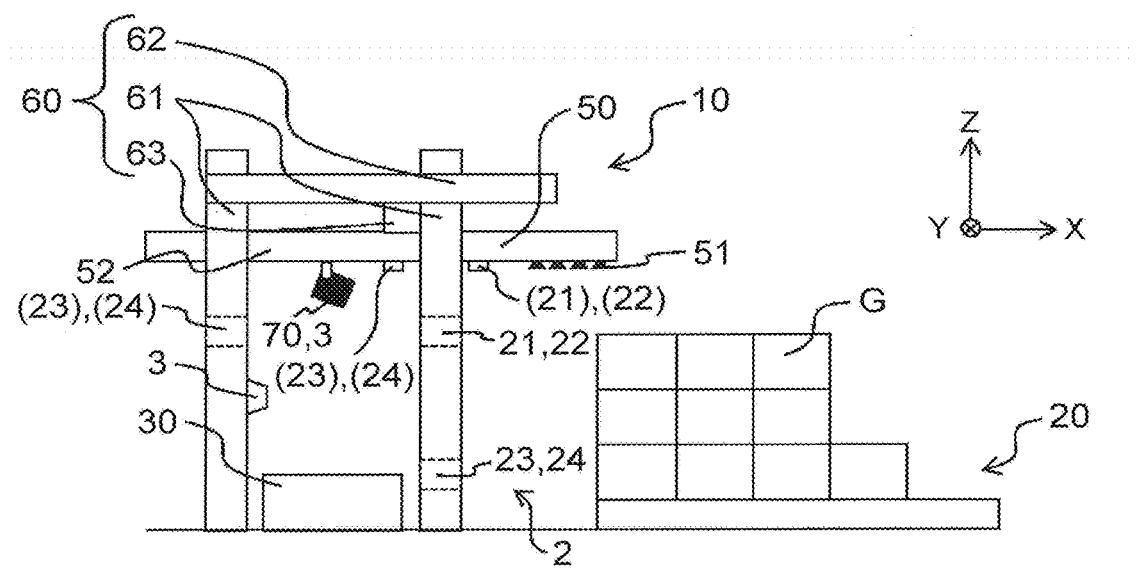

The fourth embodiment will be explained by referring to FIGS. 10A and 10B. FIGS. 10A and 10B are a top view and a front view showing one example of an object holding device 10 according to the fourth embodiment. The object holding device 10 equips the edge detection device according to the first, second and third embodiments.

First, the object holding device 10 and circumference component thereof will be explained. As shown in FIGS. 10A and 10B, a plurality of objects G is loaded on a loading region 20. The object holding device 10 and a conveyance region 30 are fixed onto a ground. The object holding device 10 selectively picks the objects G from the loading region 20, and transfers the picked object to the conveyance region 30. The object holding device 10 may be movable. For example, the object holding device 10 can equip a roller (and so on) at a bottom thereof. Alternatively, the object holding device 10 can move along a rail.

The loading region 20 may be a pallet, a basket carriage, a box pallet or a shelf to load the objects G. The loading region 20 may be movable by equipping a roller at the bottom, or may be fixed.

The conveyance region 30 conveys the objects G transferred by the object holding device 10. For example, the conveyance 30 may be a belt conveyer, a carriage, a pallet, a workbench, or a cargo bed.

As shown in FIGS. 10A and 10B, the object holding device 10 includes a holding part 50, a driving part 60, a recognition part 70, and a controller 80. The holding part 50 holds objects (to be transferred from the loading region 20 to the conveyance region 30), and moves the objects being held thereby. The driving part 60 drives the holding part 50. The recognition part 70 recognizes a shape of the object (existing on the loading region 20) from an image of the object. The controller 80 controls operation of the holding part 50 by driving the driving part 60.

The holding part 50 is connected to the driving part 60, and movable along three axes directions. Specifically, the driving part 60 drives the holding part 50 along a vertical direction, a front-back direction and a lateral direction. As shown in FIGS. 10A and 10, an orthogonal coordinate axes is set. Z-axis corresponds to the vertical direction, X-axis corresponds to the front-back direction, and Y-axis corresponds to the lateral direction. The front-back direction and the lateral direction are in parallel to a horizontal direction, i.e., a plane where the object holding part 10 is installed. The horizontal direction is in parallel to a bottom of the object as a holding target. The holding part 50 is installed so as to be opposing a top surface of the objects G loaded on the loading region 20. For example, the holding part 50 equips a plurality of suckers 51 connected to a vacuum pump (not shown in FIGS. 10a and 10B), and holds the objects G by suction. The suckers 51 are installed on a back surface of the holding part 50.

Specifically, the driving part 60 equips support parts 61, 62 and 63. A support part 61 drives the holding part 50 along Z-direction. A support part 62 drives the holding part 50 along X-direction. A support part 63 drives the holding part 50 along Y-direction.

Moreover, above-mentioned components of the holding part 50 and the driving part 60 are one example. For example, a method for holding the objects G by the holding part 50 may be clamping.

At the holding part 50 or the driving part 60, the recognition part 70 is installed.

The recognition part 70 includes the edge detection device 1 of the first, second and third embodiments. Except for the edge detection device, the recognition part 70 includes a camera or a sensor to measure a location of the objects G (loaded on the loading region 20) along a depth direction and a distance between the holding part 50 and the objects G. The recognition part 70 may be three-dimensional distance image sensor.

The light source 2 of the edge detection device 1 is located at the driving part 60 of the object holding device 10. Specifically, the light source 2 of the edge detection device 1 is located on side surfaces of two pillars of the support part 61 (driving the holding part 50 along Z-direction) at a side of the loading region 20. The light-emitting parts 21~24 of the light source 2 are located by twos, on side surfaces of two pillars of the support part 61 at the side of the loading region 20. Furthermore, the light-emitting parts 21~24 may be located one by one, on side surfaces of four pillars of the support part 61 at the side of the loading region 20. The imaging part 3 is located at an arm 52 of the holding part 50. Furthermore, the imaging part 3 may be located by a beam between two pillars (among four pillars of the support part 61) at a far side from the loading region 20. The detector 4 is included in the controller 80.

If the light-emitting parts 21~24 are respectively located at four pillars of the support part 61, edges along Z-direction on a face (at the light source side) of the objects G (loaded on the loading region 20) can be notably detected. Furthermore, if the light-emitting parts 21~24 are located at two side faces of two pillars (at the loading region side) of the support part 61 by twos, edges along Y-direction and/or Z-direction on a face (at the light source side) of the objects G can be detected.

Furthermore, the light-emitting parts 21~24 may be located on the holding part 50. In this case, the imaging part 3 is also preferably located on the holding part 50. As a result, in proportion to moving of the holding part 50, edges at a desired portion of the objects G (loaded on the loading region 20) can be detected.

In above explanation, the number of the light-emitting parts is four. However, the number thereof is not limited to four, and may be at least three.

The controller 80 controls driving of the holding part 50 and the driving part 60. Furthermore, the controller 80 includes the detector 4 of the edge detection device 1, and detects edges of the objects G based on image data imaged by the imaging part 3. A method for detecting edges is same as that of the first embodiment. The controller 80 recognizes position of objects based on detected edge information of the objects, and controls driving of the holding part 50 and the driving part 60.

In the object holding device 10 of the fourth embodiment, by equipping the edge detection device 1, position of the loaded objects G can be recognized accurately.

Furthermore, by recognizing edges of the loaded objects G along a height direction, interference or collision of the holding part 50 with the loaded objects G can be prevented.

The object holding device 10 of the fourth embodiment includes a depalletizing device, a palletizing device, a picking device, a cargo holding device and so on.

The Fifth Embodiment

The fifth embodiment is explained by referring to FIGS. 11~16. Component of an edge detection device of the fifth embodiment is same as the edge detection device of the first~third embodiments (refer to FIG. 1 or FIG. 9). In the fifth embodiment, a method for detecting edges is different from the edge detection device of the first~third embodiment.

Specifically, even if an appendix is positioned on a surface of objects (target to detect edges), a method capable of accurately detecting edges is explained.

Figure 11:
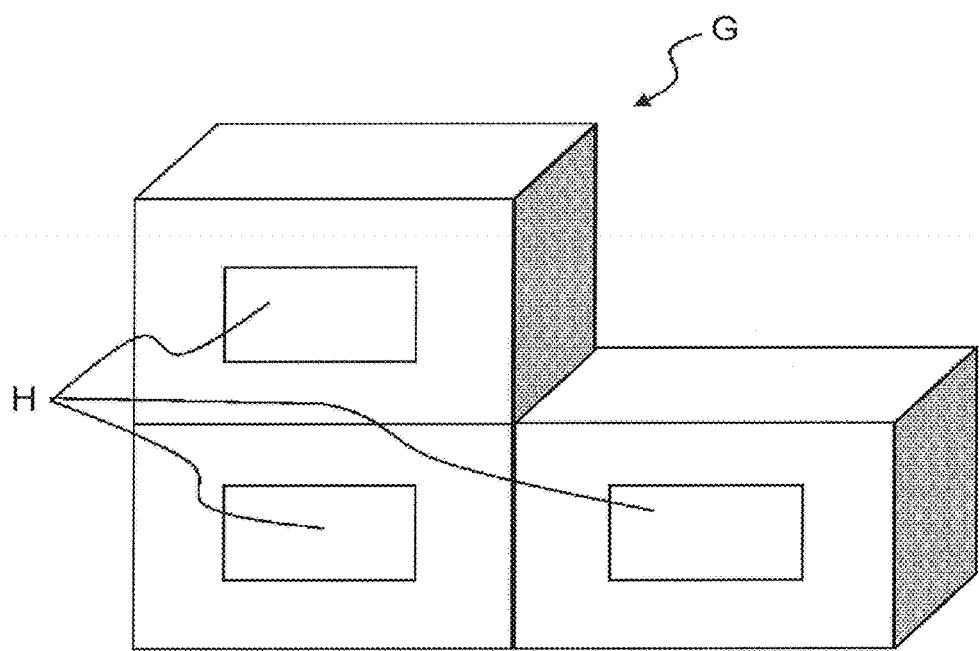
FIG. 11 is a schematic diagram showing one example of objects each having an appendix on surface thereof.
Figure 12:
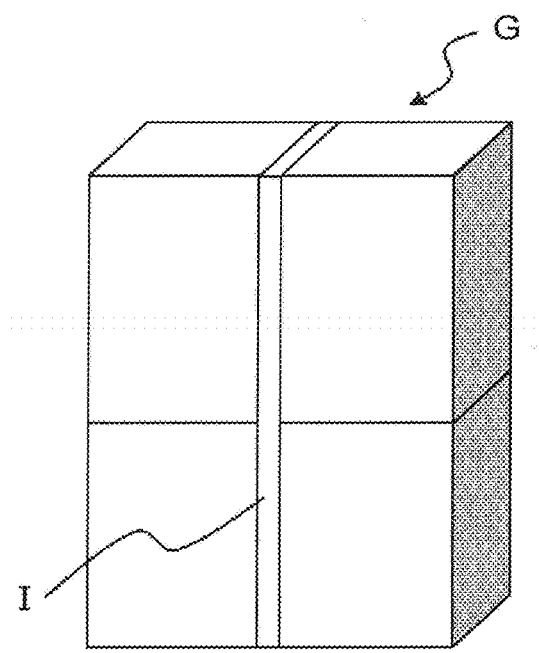
FIG. 12 is a schematic diagram showing one example of objects bundled by an appendix.

FIGS. 11 and 12 are schematic diagrams showing one example of objects as a target to detect edges. FIG. 11 shows an object G including an appendix on surface thereof. For example, the appendix is a gum tape, a plastic tape, a label, a slip, a transmittal letter, an affixing slip, or a tag. FIG. 12 shows an object G having two objects bound by an appendix I. Here, the appendix I is a binding band, a gum tape, a plastic tape, a curing tape, a polypropylene band, a packing string, or a tape.

Next, a method for detecting edges by using the edge detection device of the fifth embodiment is explained in detail.

In the imaging part 3 of the fifth embodiment, in addition to image data 31~34 (not shown in Figs.) imaged while four light-emitting parts 21~24 are lighting differently, image data 35 (not shown in Figs.) imaged while all of four light-emitting parts 21~24 are lighting is acquired. These image data is stored into the storage 3A. Based on total five image data, the detector 4 detects edges of a plurality of loaded objects. Here, the image data 35 is a color image having information representing color of the object G, which is used for processing explained afterward. The color image may be an image of RGB (Red Green Blue) color system, or an image of another color system such as HSV (Hue Saturation Value) color system. Furthermore, the image data 35 is acquired by imaging while all light-emitting parts are lighting. However, under a bright environment where color information of the object G can be acquired, the number of light-emitting parts each lighting is not limited.

The detector 4 acquires an edge extraction image 36 (not shown in Figs.) by performing same processing as the edge detection device of the first~third embodiments to the image data 31~34. However, in the edge extraction image 36 in the case that the object G includes an appendix, in addition to edges of the object G, edges of the appendix is also included.

Figure 13B:
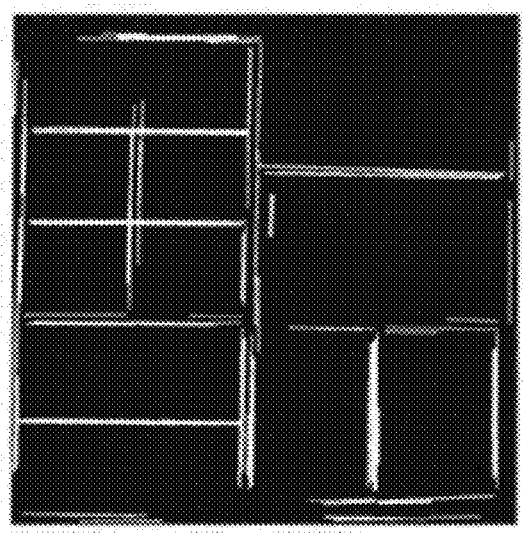
FIGS. 13A and 13B are a regular color image acquired by imaging objects, and an edge detection image acquired by the edge detection device of the third embodiment.
Figure 13A:
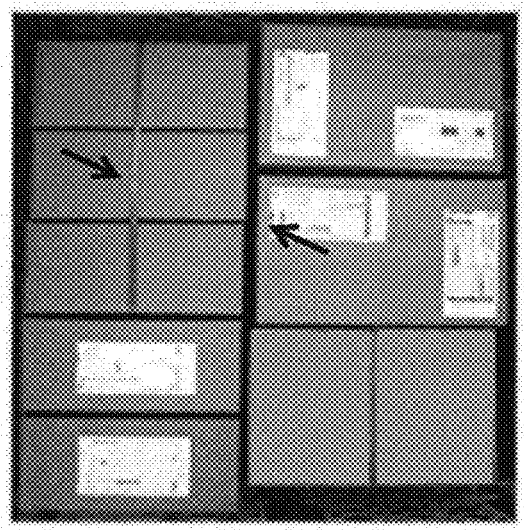

FIG. 13A shows a regular color image acquired by imaging objects, and FIG. 13B shows an edge detection image acquired by the edge detection device of the third embodiment. As shown in arrows of FIG. 13A, at a binding band of the object G and a transmittal letter of the appendix, edges different from those of the object G are confirmed. The detector 4 of the fifth embodiment performs processing to remove the edges of the appendix.

Hereinafter, processing to remove edge information of the appendix is explained in detail.

Figure 14:
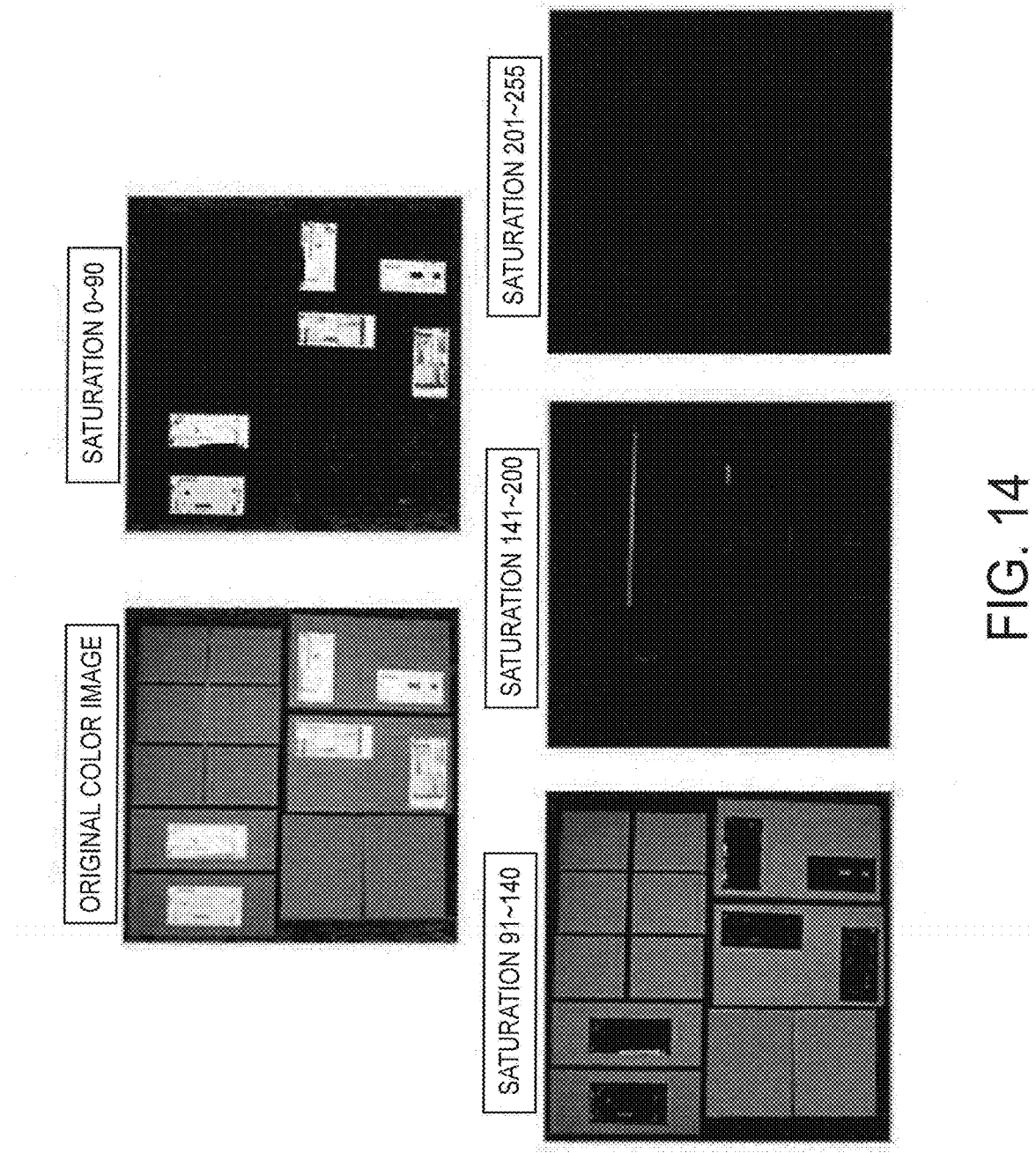
FIG. 14 is one example of a plurality of images of which color is divided by saturation.

First, by dividing a color of the image data 35, the detector 4 acquires a plurality of color-divided image data (not shown in Figs.) from the image data 35. For example, after the detector 4 generates HSV image including three components (hue, saturation, brightness) from a regular RGB image, the detector 4 divides values of saturation into a predetermined each range. By this processing, the object G and the appendix are divided by saturation. The color-divided image data is an image in which the objects and the appendix are divided. FIG. 14 is one example of a plurality of images of which color is divided by saturation. As shown in FIG. 14, it is understood that the objects and the appendix are divided by value of saturation. Moreover, the method for acquiring color-divided image data by saturation was explained. However, instead of saturation, a hue, a brightness, or a luminance may be used. Furthermore, value of each component of RBG may be used.

Figure 15B:
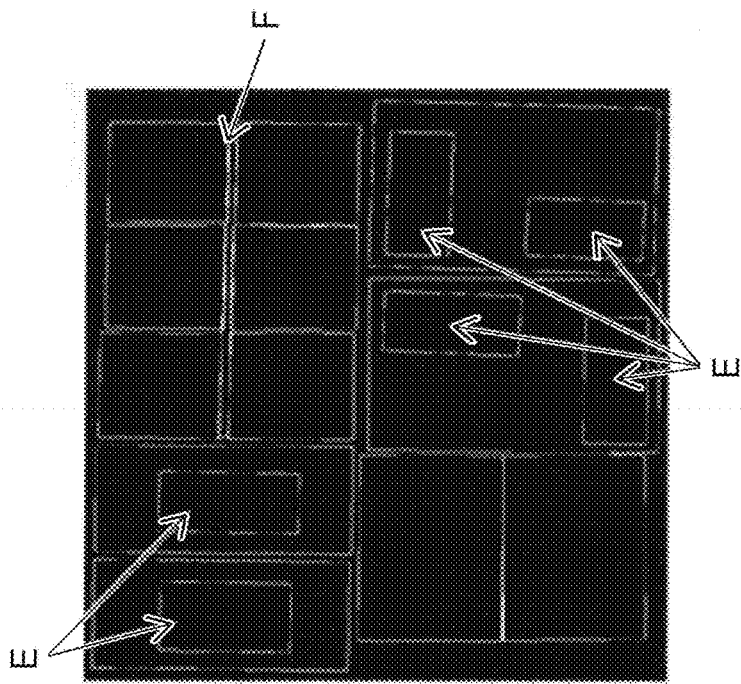
FIGS. 15A and 15B are a regular color image acquired by imaging objects, and an image acquired by overlapping an external shape of each of color-divided image data.
Figure 15A:
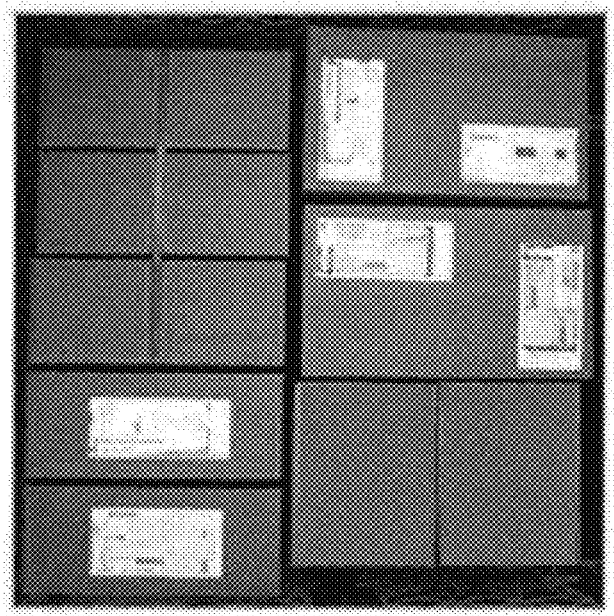

Next, the detector 4 detects an external form of a plurality of objects photographed into each of color-divided image data. For example, detection of the external form is performed by detecting a circumscribed quadrangle from respective color-divided image data. FIG. 15A shows a regular color image acquired by imaging objects, and FIG. 15B shows an image acquired by overlapping circumscribed quadrangles of the respective color-divided image data. As shown in FIG. 15B, it is understood that external forms of both the object G and the appendix are detected. Moreover, form to be detected from the color-divided image data is not limited to the circumscribed quadrangle. Another polygon, a circle, or an ellipse, may be detected. In processing up to this moment, external forms of the object G and the appendix are detected respectively.

Next, the detector 4 decides whether the detected external form belongs to the object G or the appendix. For example, this decision processing is performed as following steps.

An eternal form and a line involved in another external form are decided as an appendix. For example, they are decided as an external form such as a label (step 1). E part in FIG. 15B is corresponded. The external form of which aspect ratio is larger than a predetermined value is decided as the appendix. For example, it is decided as an external form such as binding band (step 2). F part in FIG. 15B is corresponded. An external form not decided as the appendix in steps 1 and 2 is decided as an external form (edge) of the object G (step 3).

Next, the detector 4b removes edge information decided as the appendix (by above-mentioned steps) from the edge extraction image 36. This processing is performed, for example, by multiplying a binary image (an inner part of the external form (decided as the appendix) is black, and an outer part thereof is white) with the edge extraction image 36 for each pixel.

By above-mentioned processing, from the edge extraction image 36, an image 37 (not shown in Figs.) without edge information of the appendix is acquired. If necessary, the detector 4 may perform segmentation processing and so on to the image 37. By the segmentation processing, a region where respective objects are photographed can be determined.

Figure 16:
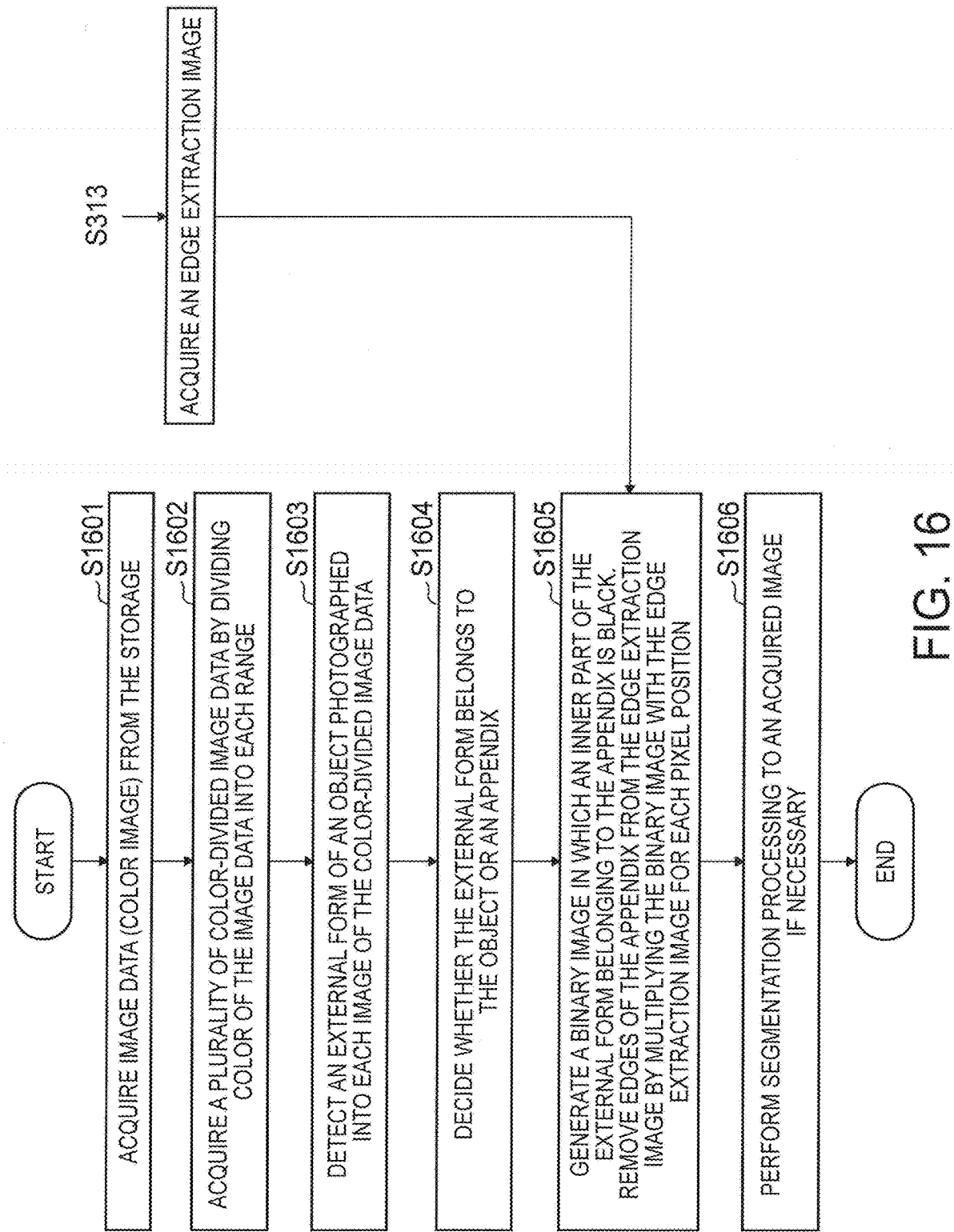
FIG. 16 is a flow chart of processing of edge detection method according to the fifth embodiment.

FIG. 16 is a flow chart of processing of edge detection method according to the fifth embodiment. First, by the same processing as the third embodiment, the edge extraction image 36 is acquired. This edge extraction image 36 is acquired by same steps as those of flow chart in FIG. 3 (S313).

Next, the detector 4 acquires image data 35 as a color image from the storage 3A (S1601).

Next, the detector 4 acquires a plurality of color-divided image data by dividing a color of the image data 35 into each range (S1602).

Next, the detector 4 detects an external form photographed into each image of the color-divided image data (S1603).

Next, the detector 4 decides whether the external shape (detected from each image) belongs to the object G or the appendix (S1604).

Next, the detector 4 generates a binary image in which an inner part of the external form (decided to belong to the appendix) is black. Furthermore, by multiplying the binary image with the edge extraction image 36 for each pixel position, the detector 4 removes edges of the appendix from the edge extraction image 36 (S1605).

Next, if necessary, the detector 4 performs segmentation processing to an image acquired at S1605 (S1606). Hereafter, processing is completed.

By using the edge detection device of the fifth embodiment, without erroneously detecting edges of the appendix, only edges of the object G can be detected accurately.

Furthermore, the edge detection method of the fifth embodiment can be applied to various objects G including the appendix. Accordingly, application range of the edge detection device can be further enlarged.

Furthermore, above-mentioned processing can be performed by the detector 4 only. Accordingly, without increasing component of the device, effect of the invention can be realized with compact component.

Furthermore, by packaging the edge detection device of the fifth embodiment into the object holding device of the fourth embodiment, recognition accuracy of the object by the object holding device can be further improved.

In above explanation, the edge detection devices according to the first, second, third and fifth embodiments are limited to objects being loaded. However, they are not limited to the objects being loaded. For example, the edge detection devices can be applied to edge-detection of a plurality of objects flatly placed without gaps therebetween. Furthermore, as to a plurality of objects (without gaps therebetween) being conveyed onto a sorter such as a distribution warehouse, the edge detection devices can be applied to edge-detection of the objects for a dividing machine or a sorting machine to divide or sort the objects.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An edge detection device comprising:
  a light source including at least three light-emitting parts for irradiating a plurality of objects adjacent with a light;
  an imaging part that images a surface of the objects irradiated by each of the light-emitting parts, and generates a plurality of image data of the surface; and
  a detector that detects edges of the surface imaged, based on at least two different combinations of the plurality of image data, wherein
  the light-emitting parts are respectively located so as to put a first plane therebetween, and are located on a second plane where the objects are placed,
  the first plane includes a line segment connecting the objects with the imaging part, and is in parallel to a direction of the edges,
  each of the different combinations includes
    one image data of the surface imaged by irradiating from one light-emitting part located at one side of the first plane among the light-emitting parts, and
    another image data of the surface imaged by irradiating from another light-emitting part located at the other side of the first plane among the light-emitting parts, the detector calculates a difference image between the one image data and the another image data in each of the different combinations, and detects the edges by multiplying two pixel values at a same pixel position between two difference images of the different combinations.

2. The edge detection device according to claim 1, wherein
the light-emitting parts includes a first light source and a second light source to put the first plane therebetween,
the first light source and the second light source respectively including at least one light-emitting part, and
the detector detects the edges of the surface, based on at least two different combinations of
a first image data of the surface imaged by irradiating from the at least one light-emitting part of the first light source, and
a second image data of the surface imaged by irradiating from the at least one light-emitting part of the second light source.

3. The edge detection device according to claim 1, wherein,
if the light-emitting parts are located on a third plane approximately in parallel to the second plane,
the detector detects edges of the surface along a direction crossing the second plane.

4. The edge detection device according to claim 1, wherein
the light-emitting parts are respectively irradiating the objects with a light at different timings, and
while one light-emitting part is irradiating the objects with a light, other light-emitting parts are located so as not to enter into an irradiated region of the one light-emitting part.

5. The edge detection device according to claim 1, wherein
a wavelength of the light of the light-emitting parts is larger than or equal to 400 nm, and smaller than or equal to 2000 nm.

6. The edge detection device according to claim 1, further comprising:
a display that displays a detection result of the edges of the surface.

7. The edge detection device according to claim 1, wherein
at least one of the plurality of image data is a color image including color information.

8. A method for detecting edges in an edge detection device,
the edge detection device including
a light source including at least three light-emitting parts for irradiating a plurality of objects adjacent with a light,
an imaging part that images the objects irradiated by each of the light-emitting parts, and
a detector that detects edges of the objects,
the light-emitting parts being respectively located so as to put a first plane therebetween, and being located on a second plane where the objects are placed,
the first plane including a line segment connecting the objects with the imaging part, and being in parallel to a direction of the edges;
the method comprising:
irradiating by each of the light-emitting parts, a surface of the objects with the light;
imaging by the imaging part, the surface irradiated by each of the light-emitting parts;
generating by the imaging part, a plurality of image data of the surface; and
detecting by the detector, edges of the surface, based on at least two different combinations of the plurality of image data, wherein
each of the different combinations includes
one image data of the surface imaged by irradiating from one light-emitting part located at one side of the first plane among the light-emitting parts, and
another image data of the surface imaged by irradiating from another light-emitting part located at the other side of the first plane among the light-emitting parts,
wherein the detecting includes
calculating a difference image between the one image data and the another image data in each of the different combinations, and
detecting the edges by multiplying two pixel values at a same pixel position between two difference images of the different combinations.

9. An object holding device comprising:
an edge detection device comprising:
a light source including at least three light-emitting parts for irradiating a plurality of objects adjacent with a light;
an imaging part that images a surface of the objects irradiated by each of the light-emitting parts, and generates a plurality of image data of the surface; and
a detector that detects edges of the surface imaged, based on at least two different combinations of the plurality of image data, wherein
the light-emitting parts are respectively located so as to put a first plane there between, and are located on a second plane where the objects are placed,
the first plane includes a line segment connecting the objects with the imaging part, and is in parallel to a direction of the edges,
each of the different combinations includes
one image data of the surface imaged by irradiating from one light-emitting part located at one side of the first plane among the light-emitting parts, and
another image data of the surface imaged by irradiating from another light-emitting part located at the other side of the first plane among the light-emitting parts,
the detector calculates a difference image between the one image data and the another image data in each of the different combinations, and detects the edges by multiplying two pixel values at a same pixel position between two difference images of the different combinations; and
at least one of a holding part and a driving part.

* * * * *